US009221976B2

(12) United States Patent
Kalyankar

(10) Patent No.: US 9,221,976 B2
(45) Date of Patent: Dec. 29, 2015

(54) ANTIREFLECTIVE COATINGS WITH SELF-CLEANING, MOISTURE RESISTANCE AND ANTIMICROBIAL PROPERTIES

(71) Applicant: Intermolecular Inc., San Jose, CA (US)

(72) Inventor: Nikhil Kalyankar, Fremont, CA (US)

(73) Assignee: Intermolecular, Inc., San Jose, CA (US)

( * ) Notice: Subject to any disclaimer, the term of this patent is extended or adjusted under 35 U.S.C. 154(b) by 0 days.

(21) Appl. No.: 14/509,898

(22) Filed: Oct. 8, 2014

(65) Prior Publication Data
US 2015/0024182 A1    Jan. 22, 2015

Related U.S. Application Data

(63) Continuation of application No. 13/536,751, filed on Jun. 28, 2012, now Pat. No. 8,883,252.

(51) Int. Cl.
| | |
|---|---|
| *B05D 5/06* | (2006.01) |
| *C09D 5/00* | (2006.01) |
| *G02B 1/115* | (2015.01) |
| *G02B 27/00* | (2006.01) |
| *B05D 1/36* | (2006.01) |
| *C09D 5/14* | (2006.01) |
| *C03C 17/34* | (2006.01) |

(52) U.S. Cl.
CPC *C09D 5/006* (2013.01); *B05D 1/36* (2013.01); *B05D 5/061* (2013.01); *C03C 17/3417* (2013.01); *C09D 5/14* (2013.01); *G02B 1/115* (2013.01); *G02B 27/0006* (2013.01); *C03C 2217/425* (2013.01); *C03C 2217/477* (2013.01); *Y10T 428/24942* (2015.01); *Y10T 428/24997* (2015.04); *Y10T 428/249969* (2015.04)

(58) Field of Classification Search
CPC .............. B05D 1/36; B05D 5/06; B32B 5/145
USPC ........................................... 427/162, 164, 165
See application file for complete search history.

(56) References Cited

U.S. PATENT DOCUMENTS

| | | | | |
|---|---|---|---|---|
| 4,830,879 | A * | 5/1989 | Debsikdar ............. | B05D 5/061 136/256 |
| 5,260,094 | A * | 11/1993 | Giannelis ............. | C01G 23/053 427/126.2 |
| 5,856,018 | A * | 1/1999 | Chen .................... | C09D 183/02 427/162 |
| 2007/0116966 | A1* | 5/2007 | Mellott ............... | C03C 17/3417 428/432 |
| 2007/0207325 | A1* | 9/2007 | Brinley ................. | C03C 1/008 428/432 |
| 2008/0292872 | A1* | 11/2008 | Boire ................... | C03C 17/002 428/325 |
| 2010/0118409 | A1* | 5/2010 | Henz .................... | C03C 17/007 359/601 |

* cited by examiner

*Primary Examiner* — Elizabeth Burkhart

(57) ABSTRACT

Coated article having antireflective property together with self cleaning, moisture resistance and antimicrobial properties can be prepared with a topmost layer of titanium oxide on an antireflective layer, which can be formed by a sol-gel process. The antireflective layer can comprise a porosity forming agent, or an alkyltrialkoxysilane-based binder. The antireflective coating can comprise silica and titania components, with pores to achieve low index of refraction and titania to achieve self-cleaning and antimicrobial properties.

18 Claims, 8 Drawing Sheets

ANTIREFLECTIVE COATINGS WITH SELF-CLEANING, MOISTURE RESISTANCE AND ANTIMICROBIAL PROPERTIES

CROSS-REFERENCE TO RELATED APPLICATIONS

This is a Continuation Application of U.S. patent application Ser. No. 13/536,751, filed on Jun. 28, 2012, which is herein incorporated by reference for all purposes.

FIELD OF THE INVENTION

Embodiments of the invention relate generally to methods and apparatuses for forming antireflection layers on substrates.

BACKGROUND OF THE INVENTION

Coatings that provide low reflectivity or a high percent transmission over a broad wavelength range of light are desirable in many applications including semiconductor device manufacturing, solar cell manufacturing, and glass manufacturing. The refractive index of a material is a measure of the speed of light in the material which is generally expressed as a ratio of the speed of light in vacuum relative to that in the material. Low reflectivity coatings generally have a refractive index (n) between air (n=1) and glass (n~1.5).

An antireflective (AR) coating is a type of low reflectivity coating applied to the surface of a transparent article to reduce reflectivity of visible light from the article and enhance the transmission of such light into or through the article thus decreasing the refractive index. One method for decreasing the refractive index and enhancing the transmission of light through an AR coating is to increase the porosity of the antireflective coating. Porosity is a measure of the void spaces in a material. Although such antireflective coatings have been generally effective in providing reduced reflectivity over the visible spectrum, the coatings have suffered from deficiencies when used in certain applications. For example, porous AR coatings which are used in solar applications are highly susceptible to moisture absorption. Moisture absorption can lead to an increase in the refractive index of the AR coating and corresponding reduction in light transmission.

Thus, there is a need for AR coatings which exhibit increased transmission, reliability and durability.

SUMMARY OF THE DISCLOSURE

In some embodiments, the present invention discloses methods and apparatuses for a coated article having antireflective property together with self cleaning, moisture resistance and antimicrobial properties. In some embodiments, a thin layer of $TiO_2$ can be disposed as a topmost layer for the coated article, acting as a protective barrier toward mechanical abrasion, together with providing water antifogging and surface photocatalysis for self cleaning and microbial contamination reduction. In some embodiments, $TiO_2$ can also be embedded in an antireflective coated layer to reduce water tendency to stay on the surface and thus minimizing light reflectance.

In some embodiments, the coated layers comprising $TiO_2$ can be deposited using a sol-gel process. A titania sol, which is a solution comprising titanium, can be used as a precursor to deposit a $TiO_2$ topmost layer. A mixture of titania sol and silica sol, where silica sol is a solution comprising silicon, can be used as a precursor to deposit an antireflective layer comprising embedded $SiO_2$. Curing and heat treatment can be included to evaporate solvent and solidify the sol-gel coatings.

In some embodiments, the present invention discloses coated articles, and methods of fabrication thereof, comprising multiple layers of porous antireflective coating. The porous antireflective coating can comprise silica and titania components, with pores to achieve low index of refraction and titania to achieve self-cleaning and antimicrobial properties. Different layers of porous antireflective coating can have different index of refraction, for example, achieved by different pore sizes or different ratio of silica and titania, to improve the antireflective property.

In some embodiments, the multiple layers of porous antireflective coating can included a topmost $TiO_2$ layer, which can provide self cleaning, moisture resistance and antimicrobial properties for the porous antireflective coatings.

In some embodiments, the present invention discloses coated articles, and methods of fabrication thereof, comprising porous antireflective coatings together with a topmost $TiO_2$ layer. The porous antireflective coatings can comprise a molecular porogen which can be a self assembling molecular porogen where different pore sizes can be obtained in one annealing step. The porous antireflective coatings can be achieved with a sol-gel composition comprising at least one self assembling molecular porogen and removing the at least one self assembling molecular porogen to form the porous coating. The topmost $TiO_2$ layer can provide self cleaning, moisture resistance and antimicrobial properties for the porous antireflective coatings.

In some embodiments, the present invention discloses coated articles, and methods of fabrication thereof, comprising porous antireflective coatings together with a topmost $TiO_2$ layer. The porous antireflective coatings can comprise at least one porosity forming agent, such as dendrimers and organic nanocrystals, which can be removed during the anneal process to form the porous coatings. The porous antireflective coatings can be achieved with a sol-gel composition comprising a porosity forming agent, such as dendrimers and organic nanocrystals, together with a heat treatment process to control the porosity of the antireflective coatings. The topmost $TiO_2$ layer can provide self cleaning, moisture resistance and antimicrobial properties for the porous antireflective coatings.

In some embodiments, the present invention discloses coated articles, and methods of fabrication thereof, comprising porous antireflective coatings together with a topmost $TiO_2$ layer. The porous antireflective coatings can comprise an alkyltrialkoxysilane-based binder. The porous antireflective coatings can be achieved with a sol-gel composition comprising an alkyltrialkoxysilane-based binder, together with a heat treatment process to control the porosity of the antireflective coatings. The topmost $TiO_2$ layer can provide self cleaning, moisture resistance and antimicrobial properties for the porous antireflective coatings.

In some embodiments, the present invention discloses photovoltaic devices, and methods of fabrication thereof, comprising a topmost $TiO_2$ layer or embedded $TiO_2$ material. The topmost $TiO_2$ layer can provide self cleaning, moisture resistance and antimicrobial properties for the porous antireflective coatings. The embedded $TiO_2$ can reduce water tendency to stay on the surface and thus minimizing light reflectance.

BRIEF DESCRIPTION OF THE DRAWINGS

To facilitate understanding, identical reference numerals have been used, where possible, to designate identical elements that are common to the figures. The drawings are not to scale and the relative dimensions of various elements in the drawings are depicted schematically and not necessarily to scale.

The techniques of the present invention can readily be understood by considering the following detailed description in conjunction with the accompanying drawings, in which.

DETAILED DESCRIPTION OF THE PREFERRED EMBODIMENTS

Figure 1A:
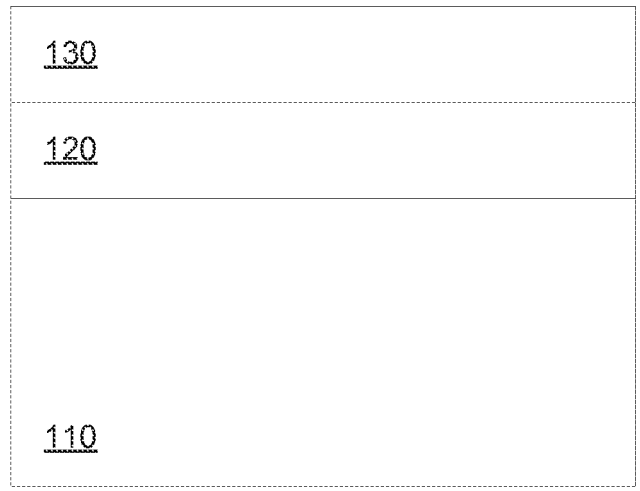
FIGS. 1A-1B illustrates exemplary coated articles comprising a titanium oxide coating on an antireflective layer according to some embodiments of the present invention.

A detailed description of one or more embodiments is provided below along with accompanying figures. The detailed description is provided in connection with such embodiments, but is not limited to any particular example. The scope is limited only by the claims and numerous alternatives, modifications, and equivalents are encompassed. Numerous specific details are set forth in the following description in order to provide a thorough understanding. These details are provided for the purpose of example and the described techniques can be practiced according to the claims without some or all of these specific details. For the purpose of clarity, technical material that is known in the technical fields related to the embodiments has not been described in detail to avoid unnecessarily obscuring the description.

In some embodiments, the present invention discloses methods and apparatuses for a coated article having antireflective property together with self cleaning, moisture resistance and antimicrobial properties. In some embodiments, a thin layer of titanium oxide (e.g., titania $TiO_2$) can be disposed as a topmost layer for the coated article, acting as a protective barrier toward mechanical abrasion, together with providing water antifogging and surface photocatalysis for self cleaning and microbial contamination reduction. In some embodiments, titanium oxide can also be embedded in an antireflective coated layer to reduce water tendency to stay on the surface and thus minimizing light reflectance.

The self-cleaning surface sometimes can be achieved with a hydrophobic coating, e.g., a coating that results in water droplets having high contact angles. With high contact angles, the water droplets can roll across the hydrophobic surface, performing the cleaning action. The self-cleaning surface with hydrophobic coatings can also minimize light reflectance due to the removal of water droplets.

The light reflectance minimization sometimes can be achieved with a hydrophilic coating, e.g., a coating that results in water droplets having low contact angles. With low contact angles, the water droplets can spread out and consolidate, forming a thin uniform sheet of water instead of multiple individual droplets. The uniform water sheet can exhibit lower light reflection than individual water droplets.

In some embodiments, the present invention discloses a titanium oxide coating on an antireflective coating to provide a coated article having self-cleaning and antimicrobial properties. The titanium oxide coating can be highly durable and offer improved self cleaning behavior. In some embodiments, the titanium oxide coated article can be used in photovoltaic devices, and other glass applications, such as antifog mirrors, windows, picture frames, and greenhouses.

In some embodiments, the titanium oxide coating comprises a solid layer, providing better moisture resistance, self-cleaning and antimicrobial properties. In some embodiments, the titanium oxide coating comprises a porous layer, which has a lower index of refraction for providing better antireflective property. In some embodiments, the coating is disposed on an antireflective coating, and the two coatings are optimized for selective applications. For example, solid titanium oxide coating on an antireflective coating is used for improve moisture resistance and antimicrobial properties, while porous titanium oxide coating on an antireflective coating is used for achieving better antireflective properties.

Titanium oxide coating, when exposed to light, can act as an antimicrobial agent, with the photodisinfection being the result of a photocatalytic process on the titanium oxide surface. The basic mechanism of titanium oxide photocatalysis is the production of reactive species at the catalyst surface. Irradiation of titanium oxide with light having energy greater than the band gap of titanium oxide can cause promotion of an electron from the valance band to the conduction band, resulting in a free electron in the conduction band and a hole in the valance band. The free electrons and holes then participate in the oxidation and reduction processes within the titanium oxide coating (e.g., electron and hole recombination) or with molecules absorbed at the titanium oxide surface to form reactive species at the surface. For example, redox reactions between the photo-excited titanium oxide and absorbed water molecules, molecular oxygen and hydroxide groups can generate hydroxyl radicals, which are highly reactive. The hydroxyl radicals can be a very potent biocide, having the ability to oxidize most organic compounds at the titanium oxide surface.

Titanium oxide crystallization forms either an anatase phase or a rutile phase, with the anatase phase having band gap energy more suitable for photocatalysis.

Figure 1B:
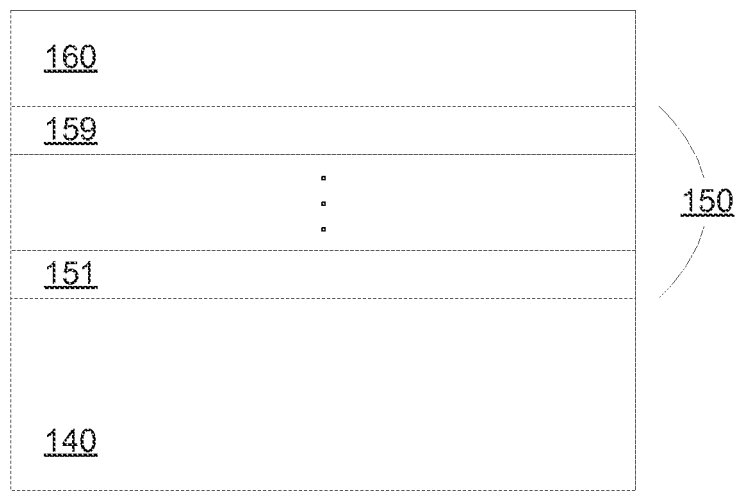

FIGS. 1A-1B illustrates exemplary coated articles comprising a titanium oxide coating on an antireflective layer according to some embodiments of the present invention. In FIG. 1A, an antireflective layer 120 is disposed on a glass substrate 110. A titanium oxide coating 130 is disposed on the antireflective coating 120. The titanium oxide coating preferably comprises anatase phase. The titanium oxide coating can comprise a porous layer or a solid layer. The topmost titanium oxide coating can offer self-cleaning, water repellent, and antimicrobial properties for the coating stack.

In some embodiments, the present invention discloses coated articles, and methods of fabrication thereof, comprising a topmost titanium oxide layer. The titanium oxide layer is thin, and is preferably a few nanometers in thickness. The titanium oxide layer can comprise crystalline titanium oxide material, preferably anatase phase for being photoactive in order to achieve self cleaning and antimicrobial properties. In some embodiments, the titanium oxide layer is dense to enhance the photoactivity characteristics. In some embodiments, the titanium oxide layer is porous with adjusted index of refraction to increase light transmission.

In some embodiments, the titanium oxide coating can be formed by a sol-gel deposition process. Its thickness is preferably less than about 12 nm. The titanium oxide top layer thus can act as a protecting barrier toward mechanical abrasions and can provide self-cleaning (e.g., by rolling water droplets) and antimicrobial (e.g., by photocatalysis) at the surface.

In some embodiments, the titanium oxide coating can be formed by a dry coating process, such as an arc ion plating process or a vacuum deposition process, such as physical vapor deposition (PVD) or chemical vapor deposition (CVD).

In some embodiments, the present invention discloses methods and processes to form a top coating of titanium oxide on an antireflective coating using a sol-gel technique. Different sol gel formulations can be employed in a multiple coating step approach to achieve the two coatings using individual or combinations of particle-containing sol formulations. For example, multiple sol-gel coatings can be sequentially fabricated on the substrate. The multiple sol-gel coatings can be deposited one after another on the substrate, with optional drying steps, intermediate heat treatment steps or final heat treatment steps after one or more coatings.

In general, a sol-gel process is a process where a wet formulation (commonly called the sol or sol-formulation) is dried to form a gel coating (e.g., gel-formulation) having both liquid and solid characteristics. The gel coating is then heat treated to form a solid material. The gel coating or the solid material can be formed by applying a thermal treatment to the sol. This technique is widely used for antireflective coatings because it is easy to implement and provides films of uniform composition and thickness.

In some embodiments, the coated layers comprising titanium oxide can be deposited using a sol-gel process. A titania sol, which is a solution comprising titanium, can be used as a precursor to deposit a titanium oxide topmost layer. Curing and heat treatment can be included to evaporate solvent and solidify the sol-gel coatings.

In some embodiments, the titania sol can comprise an inorganic titanium precursor (such as $TiCl_4$) together with an oxygen precursor (such as water or alcohol). In some embodiments, the titania sol can comprise a titanium organometallic precursor, such as titanium tetra-isobutoxide, titanium tetra-isopropoxide, and titanium tetra-ethoxide.

In some embodiments, the titania sol can be optionally combined with solvents, anti-foaming agents, surfactants, etc., to adjust the characteristics of the coated layers.

In some embodiments, the present invention discloses an antireflective coating comprising multiple layers of silica-titania coatings. The multiple layers can comprise a mixture of silica and titania, and can be porous to achieve an index of refraction between that of glass and air to reduce light reflection from the glass/air interface. The multiple layers of silica-titania coatings can comprise different sol-gel formulations of silica and titania. For example, the weight ratio of silica, titania, and other silica or titania precursor materials can be varied. Alternatively, the weight percentage of solids in the coating formulation can be varied.

In some embodiments, the present invention discloses a titanium oxide coating disposed on multiple layers of silica-titania coatings. The titanium coating and/or the multiple layers of silica-titania coatings can be formed using a sol-gel process involving silica sols and titania sols.

In some embodiments, the coating, gel-formation, and annealing can be repeated to form a multilayered coating with any number of layers. The multilayer coatings can comprise different sol formulations of titania and silica, such as different types of sol formulations, different ratios of titania and silica, different particle sizes, different precursors, different weight percentage or weight ratio, etc. For example, the different titania/silica characteristics can form a coating with graded porosity, such as higher porosity adjacent to air and a lower porosity adjacent to the substrate surface. The graded coating can be further modified by altering various parameters, such as, the anneal time, and the anneal temperature.

In FIG. 1B, a multilayer coating 150 is disposed on a glass substrate 140. The multilayer coating 150 comprises multiple layers 151-159 of different sol formulations of silica and titania. The different sol formulations can be selected to achieve an optimum antireflective property, such as forming a gradual change in index of refraction or variation in porosity. A titanium oxide coating 160 is disposed on the multilayer coating 150. The titanium oxide coating can comprise a porous layer or a solid layer. The topmost titanium oxide coating can offer self-cleaning, water repellent, and antimicrobial properties for the coating stack.

In some embodiments, the present invention discloses coated articles, and methods of fabrication thereof, comprising $TiO_2$ embedded in an antireflective layer, which comprises $SiO_2$. The antireflective layer can comprise a mixture of silica and titania, and can be porous to achieve an index of refraction between that of glass and air to reduce light reflection from the glass/air interface.

In some embodiments, the present invention discloses coated articles, and methods of fabrication thereof, comprising porous antireflective coatings together with a topmost $TiO_2$ layer. The porous antireflective coatings can comprise silica and titania components, with pores to achieve low index of refraction and titania to achieve moisture resistance properties. The topmost $TiO_2$ layer can provide self cleaning, moisture resistance and antimicrobial properties for the porous antireflective coatings.

Figure 2:
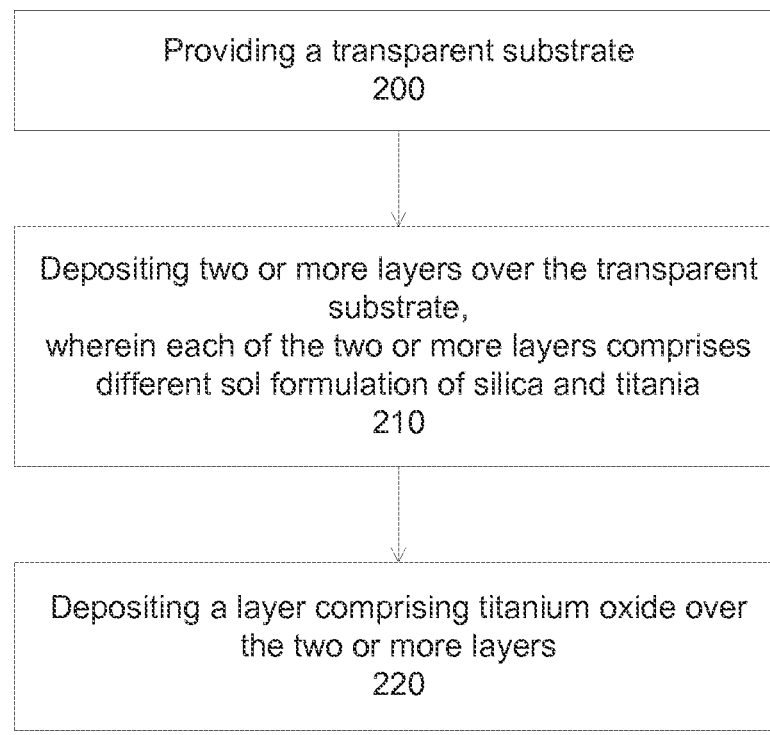
FIG. 2 illustrates an exemplary flowchart to form a coating stack comprising a multilayer coating and a topmost titanium oxide layer according to some embodiments of the present invention.

FIG. 2 illustrates an exemplary flowchart to form a coating stack comprising a multilayer coating and a topmost titanium oxide layer according to some embodiments of the present invention. In operation 200, a transparent substrate is provided. In operation 210, two or more layers are deposited over the transparent substrate, wherein each of the two or more layers comprises a different sol formulation of silica and titania. In operation 220, a layer comprises titanium oxide is deposited over the two or more layers.

In some embodiments, multiple sol formulations comprising different characteristics are sequentially coated on a substrate to form a multilayer coating with variation, e.g., in titania/silica density, sizes, shapes, particles and/or binders characteristics, types of sol formulations, types of precursors, weight percentage or weight ratio. For example, the multiple sol formulations can be sequentially coated on a substrate, then dried and heat treated together to form the multilayer coating. Alternatively, each sol formulation can be coated and dried on the substrate to form separate gel coatings. The multiple gel coatings can be heat treated together to form the multilayer coating. Alternatively, each sol formulation can be coated, dried and heat treated at an intermediate temperature (which is less than the temperature of the final heat treatment for forming a sol-gel layer) on the substrate to form separate gel coatings. The multiple gel coatings can be heat treated together at a final temperature to form the multilayer coating. Alternatively, each sol formulation can be coated, dried and heat treated at the final temperature on the substrate to form the multilayer coating.

Figure 3:
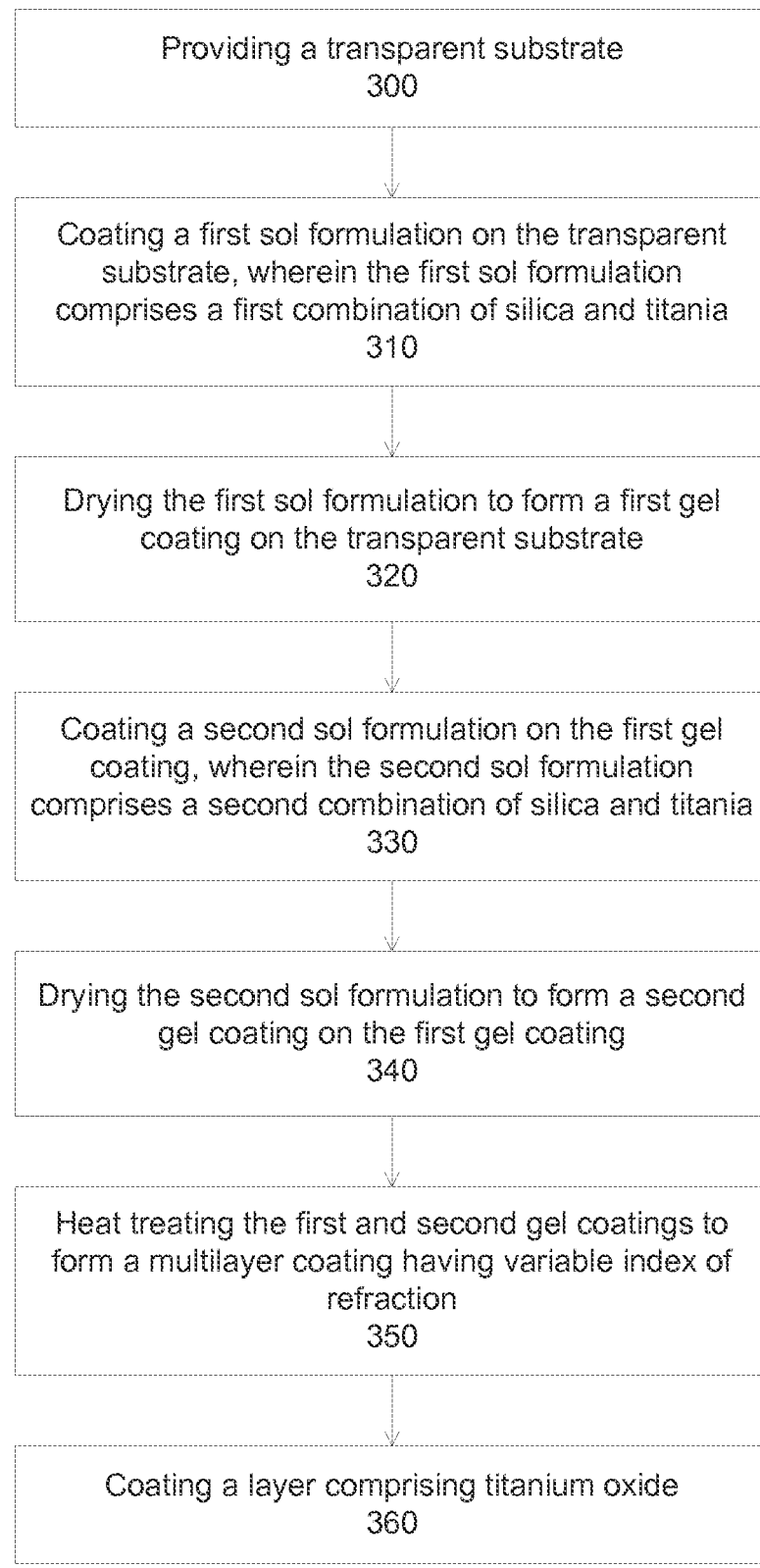
FIG. 3 illustrates another exemplary flowchart to form a coating stack comprising a multilayer coating and a topmost titanium oxide layer according to some embodiments of the present invention.

FIG. 3 illustrates another exemplary flowchart to form a coating stack comprising a multilayer coating and a topmost titanium oxide layer according to some embodiments of the present invention. The multilayer coating can comprise a porous silicon oxide ($Si_xO_y$) coating, a porous titanium oxide ($Ti_xO_y$) coating, or a combination of porous silicon oxide coating and porous titanium oxide coating. The multilayer coating can comprise variation in porosity, which can lead to variation of index of refraction, improving the antireflective property of the coated layers. Details of the index of refraction variation in multilayer coating can be found in co-owned, co-pending application, Attorney Docket IM0567, entitled "Novel antireflective coatings with graded refractive index", which is hereby incorporated by reference.

In operation 300, a transparent substrate is provided. A sol formulation can be prepared comprising a first combination of silica and titania. For example, a silica sol can be prepared using a mixture of a polymeric component of silica, colloidal silica and a solvent. An exemplary polymeric component of silica can be prepared using n-propanol, glycidoxy-propylt-rimethoxysilane, water and hydrochloric acid. The silica sol can be prepared using the polymeric component of silica, colloidal silica, and methyl ethyl ketone solvent. Another silica sol can be prepared using tetraethoxysilane (TEOS) with hydrochloric acid in ethanol solvent. Other silica sols can be used, such as silica sols comprising a porous forming agent or a binder. A titania sol can be prepared using n-propanol, titanium tetra-isobutoxide, water and hydrochloric acid. Another titania sol can comprise titanium tetrachloride ($TiCl_4$) and a polymer in ethanol solvent. Other titania sols can be used.

A sol formulation comprising a combination of silica and titania can be prepared by mixing a silica sol with a titania sol. Different silica/titania sol formulations can be prepared by mixing different ratios of same silica sol and titania sol. Alternatively, different silica/titania sol formulations can be prepared by mixing different silica sols and titania sols. The different silica and titania sols can comprise different silica or titania components, different sizes or shapes of silica or titania particles, different polymer or acid components, or other components.

In operation 310, the first sol formulation is coated on the transparent substrate. Exemplary substrates include glass, silicon, metallic coated materials, or plastics. The substrate can be a transparent substrate. The substrate could be optically flat, textured, or patterned. The substrate can be flat, curved or any other shape as necessary for the application under consideration. Exemplary glass substrates include high transmission low iron glass, borosilicate glass (BSG), soda lime glass and standard clear glass. The sol-gel composition can be coated on the substrate using, for example, dip-coating, spin coating, curtain coating, roll coating, capillary coating, or a spray coating process. Other application methods known to those skilled in the art can also be used. The substrate can be coated on a single side or on multiple sides.

In operation 320, the first sol formulation is dried to form a first gel coating. A gel is a coating that has both liquid and solid characteristics and can exhibit an organized material structure (e.g., a water based gel is JELL-O®). During the drying, the solvent of the sol-gel composition is evaporated and further bonds between the components, or precursor molecules, can be formed. The drying can be performed by exposing the coating on the substrate to the atmosphere at room temperature. The coatings (and/or the substrates) can alternatively be exposed to a heated environment at an elevated temperature above the boiling point of the solvent. The drying temperature can vary depending on the formulation of the sol-gel compositions used to form the coatings. In one embodiment, the drying temperature can be in the range of approximately 25 degrees Celsius to approximately 200 degrees Celsius. In one embodiment, the drying temperature can be in the range of approximately 50 degrees Celsius to approximately 60 degrees Celsius. The drying process can be performed for a time period of between about 1 minute and 10 minutes, for example, about 6 minutes. Drying temperature and time are dependent on the boiling point of the solvent used during sol formation.

In operation 330, a second sol formulation is prepared with a second sol formulation comprising a second combination of silica and titania. The first and second sol formulations comprise at least a different characteristic of the silica and/or titania. For example, the second sol formulation can comprise a different type of titania and/or silica precursor than the first sol formulation. Other characteristics can be varied, such as weight ratio, or weight percentage.

The second sol formulation is then coated on the first gel coating. In some embodiments, the first and second sol formulations comprise a different characteristic to form layers with different indices of refraction. In operation 340, the second sol formulation is dried to form a second gel coating. In operation 350, the first and second gel coatings are heat treated to form a multilayer coating. The annealing temperature and time can be selected based on the chemical composition of the sol-gel compositions, depending on what temperatures can be required to form cross-linking between the components throughout the coating. In one embodiment, the annealing temperature can be in the range of 500 degrees Celsius and 1,000 degrees Celsius. In one embodiment, the annealing temperature can be 600 degrees Celsius or greater. In another embodiment, the annealing temperature can be between 625 degrees Celsius and 650 degrees Celsius. The annealing process can be performed for a time period of between about 3 minutes and 1 hour, for example, about 6 minutes. The porous coating can have a thickness about 10 nanometers, or less than about 50 nm. The porous coating can have a thickness between about 5 nanometers and about 1,000 nanometers. Operations 310-350 can be repeated, for example, with different sol formulations. For example, another first sol formulation can be coated and dried to form another first gel coating. One or more first and second sol formulations can be coated and dried to form one or more first and second gel coatings.

In operation 360, a layer comprises titanium oxide is deposited over the first and second gel coatings. For example, a third sol formulation comprising titanium oxide is prepared and coated on the multilayer coating. The third sol formulation can comprise a titania sol, as discussed above. The third sol coating is dried and heat treated to form a topmost coating comprising titanium oxide.

Figure 4:
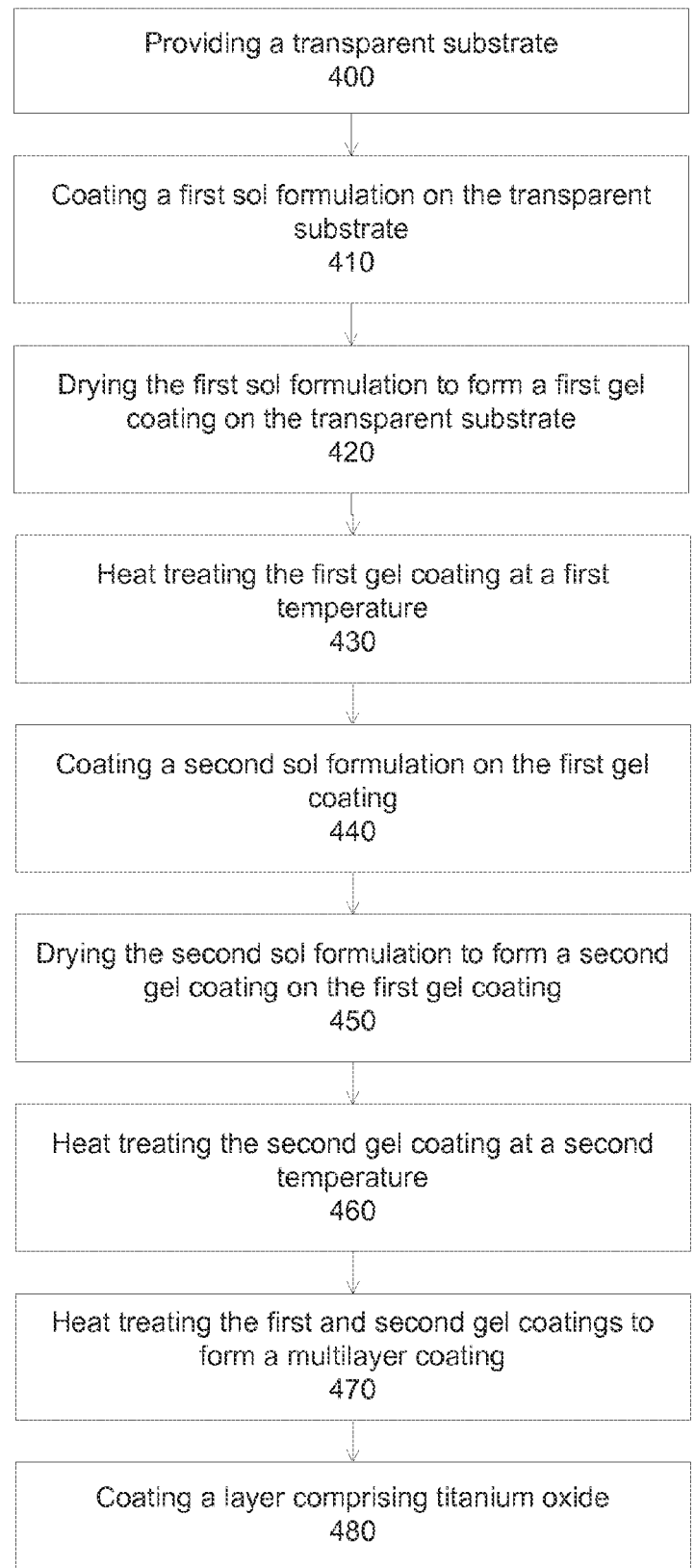
FIG. 4 illustrates another exemplary flowchart to form a coating stack comprising a multilayer coating and a topmost titanium oxide layer according to some embodiments of the present invention.

FIG. 4 illustrates another exemplary flowchart to form a coating stack comprising a multilayer coating and a topmost titanium oxide layer according to some embodiments of the present invention. In operation 400, a transparent substrate is provided. In operation 410, a first sol formulation is coated on the transparent substrate. In operation 420, the first sol formulation is dried to form a first gel coating. In operation 430, the first gel coating is heat treated at a first temperature, which can be less than or equal to a final curing temperature. In operation 440, a second sol formulation is coated on the first gel coating. The first and second sol formulations comprise a different characteristic of silica and titania, for example, to form layers with different indices of refraction. In operation 450, the second sol formulation is dried to form a second gel coating. In operation 460, the second gel coating is heat treated at a second temperature, which can be less than or equal to a final curing temperature. In operation 470, the first and second gel coatings are optionally heat treated to form a multilayer coating. Operations 410-470 can be repeated to form multiple stacks of first and second gel coatings, for example, with different sol formulations. In operation 480, a layer comprises titanium oxide is deposited over the first and second gel coatings. For example, a third sol formulation comprising titanium oxide is prepared and coated on the multilayer coating. The third sol coating is dried and heat treated to form a topmost coating comprising titanium oxide.

In some embodiments, other configurations can be used. For example, multiple first and second gel coatings (comprising different titania/silica formulations) together with a topmost titania gel coating (comprising a titania formulation) are formed before the whole stack is subjected to a heat treatment process.

In some embodiments, multiple sol formulations comprising different characteristics are mixed together before coating on a substrate to form a multilayer coating. For example, the multiple sol formulations can form separate layers or can form an integrated layer having different characteristics.

In some embodiments, the present invention discloses a titanium oxide coating disposed on a porous layer of silica coating. The titanium coating can be formed using a sol-gel process involving a titania sol. The porous layer of silica coating can be formed using a sol-gel process involving a porosity forming agent in a silica sol.

Figure 5:
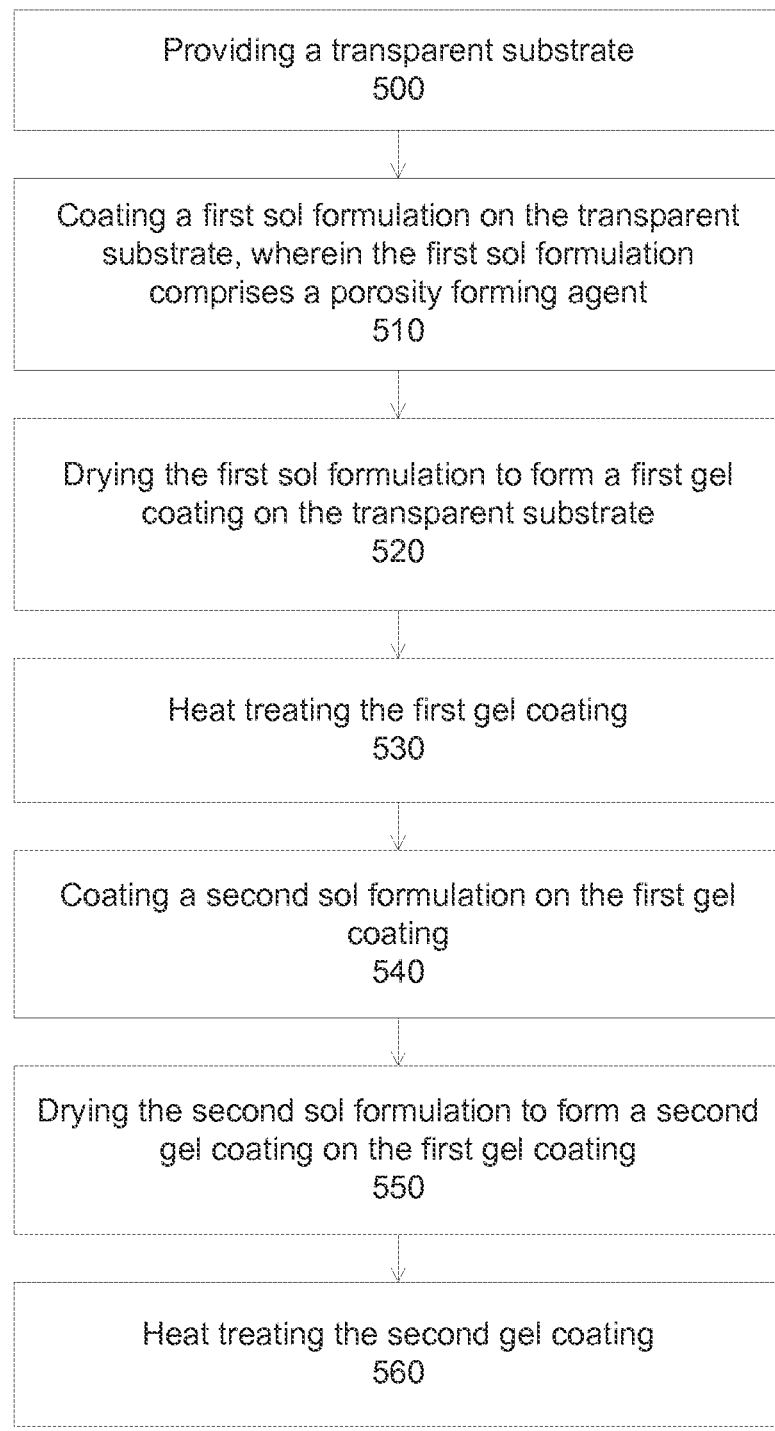
FIG. 5 illustrates an exemplary flowchart to form a coating stack comprising a porous layer and a topmost titanium oxide layer according to some embodiments of the present invention.

FIG. 5 illustrates an exemplary flowchart to form a coating stack comprising a porous layer and a topmost titanium oxide layer according to some embodiments of the present invention. In operation 500, a transparent substrate is provided. In operation 510, a first sol formulation can be prepared comprising a porosity forming agent. In operation 520, the first sol formulation is dried to form a first gel coating. In operation 530, the first gel coating is heat treated. In operation 540, a second sol formulation can be prepared comprising titanium oxide. In operation 550, the second sol formulation is dried to form a second gel coating. In operation 560, the second gel coating is heat treated.

In some embodiments, a sol formulation comprising a porosity forming agent can be used. In general, a porosity forming agent comprises a chemical compound which burns off upon combustion to form a void space or pore. After drying to form the gel coating, a heat treatment process can be used to form a porous coating. For example, the porosity forming agent can decompose or combust to form voids of a desired size and shape upon heating. The porosity forming agent can lead to the formation of stable pores with variable volume and index of refraction, e.g., the presence of the pores imparts a different index of refraction to the layer in which they are formed. Further, the size and interconnectivity of the pores can be controlled via selection of the porosity forming agent, the total porosity forming agent fraction, polarity of the molecule and solvent, and other physiochemical properties of the gel phase. The porosity forming agent can comprise dendrimers, organic nanocrystals, or a molecular porogen. Other details of sol formulations comprising a porosity forming agent can be found in co-owned, co-pending applications, application Ser. No. 13/046,899 with filing date of Mar. 14, 2011, entitled "Sol-gel based formulations and methods for preparation of hydrophobic ultra low refractive index antireflective coatings on glass"; and application Ser. No. 13/041,137 with filing date of Mar. 4, 2011, entitled "Sol-gel based antireflective (ar) coatings with controllable pore size using organic nanocrystals and dendrimers", both of which are hereby incorporated by reference.

In some embodiments, the present invention discloses methods to form antireflective coatings with a porosity forming agent. For example, a porosity forming agent, such as a molecular porogen is added, for example, in quantities ranging from 0.01 to 0.1 wt. % in the beginning of a hydrolysis or polycondensation reaction. At the end of such hydrolysis or polycondensation reactions, additional molecular porogen can be added, for example, in quantities ranging from about 0.1 to 5 wt. %. Initial addition of the molecular porogen results in assimilation of the molecular porogen into the polymeric network or matrix prior to aggregation (leading to significantly smaller nanopores upon annealing) and later addition of the molecular porogen results in molecular aggregation during coating, leading to larger pores upon annealing. Thus multilayer coatings having smaller and larger pores, leading to higher and lower indices of refraction, respectively, could be obtained.

In some embodiments, in addition to the porosity forming agent (for example, molecular porogen), the sol-gel system further includes a film forming precursor which forms the primary structure of the gel and the resulting solid coating. Exemplary film forming precursors include silicon containing precursors and titanium based precursors. The sol-gel system can further include alcohol and water as the solvent system, and either an inorganic or organic acid or base as a catalyst or accelerator. A combination of the aforementioned chemicals leads to formation of sol through hydrolysis and condensation reactions. Various coating techniques, including dip-coating, spin coating, spray coating, roll coating, capillary coating, and curtain coating as examples, can be used to coat thin films of these sols onto a solid substrate (e.g., glass). During the coating process, a substantial amount of solvent evaporates leading to a sol-gel transition with formation of a wet film (e.g., a gel). Around or during the sol-gel transition, the porosity forming agent can form nanostructures. The deposited wet thin films containing micelles or porogen nanostructures can then be heat treated to remove excess solvent and annealed at an elevated temperature to create a polymerized —Si—O—Si— or —Ti—O—Ti— network and remove all excess solvent and reaction products formed by oxidation of the porosity forming agent, thus leaving behind a porous film with a low refractive index, where n is less than 1.3, to ultra low refractive index where n is less than 1.2.

In some embodiments, the present invention discloses a titanium oxide coating disposed on a porous layer of silica coating. The titanium coating can be formed using a sol-gel process involving a titania sol. The porous layer of silica coating can be formed using a sol-gel process involving a porosity forming agent in a silica sol.

Figure 6:
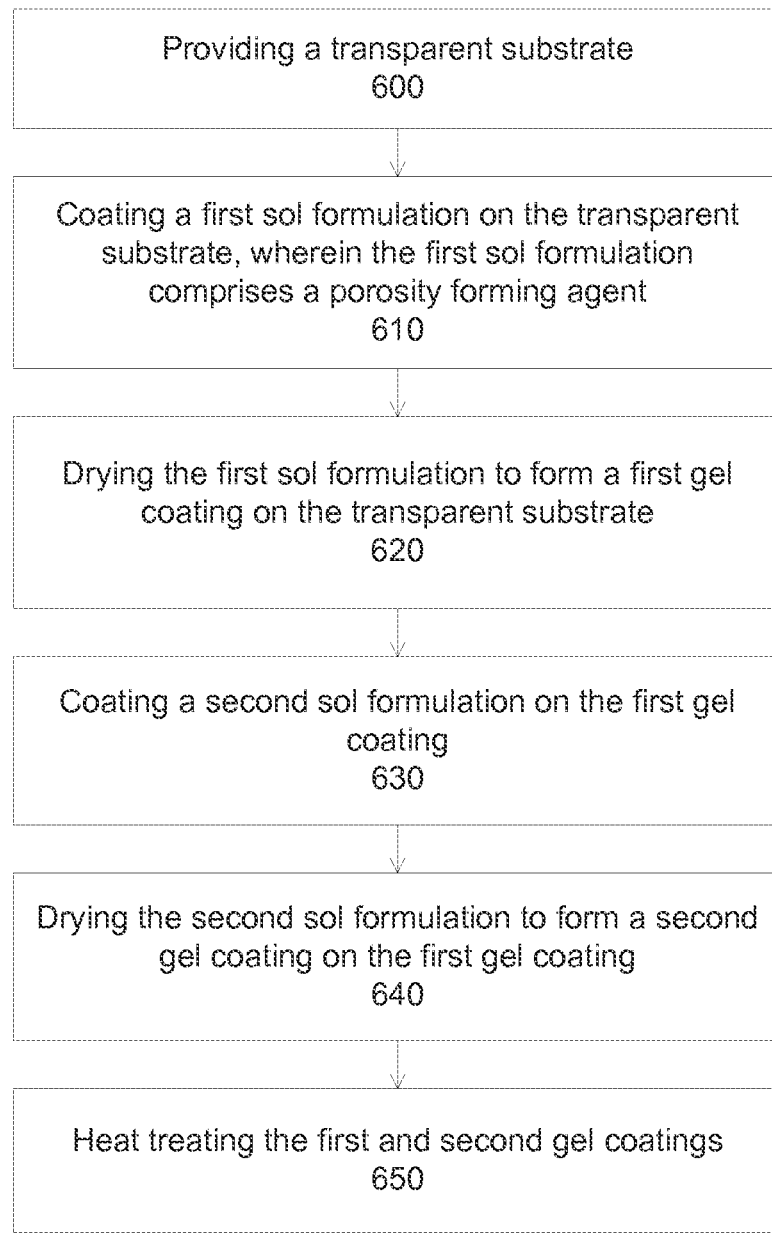
FIG. 6 illustrates another exemplary flowchart to form a coating stack comprising a porous layer and a topmost titanium oxide layer according to some embodiments of the present invention.

FIG. 6 illustrates another exemplary flowchart to form a coating stack comprising a porous layer and a topmost titanium oxide layer according to some embodiments of the present invention. In operation 600, a transparent substrate is provided. In operation 610, a first sol formulation can be prepared comprising a porosity forming agent. In operation 620, the first sol formulation is dried to form a first gel coating. In operation 630, a second sol formulation can be prepared comprising titanium oxide. In operation 640, the second sol formulation is dried to form a second gel coating. In operation 650, the first and second gel coatings are heat treated to form a multilayer coating.

In some embodiments, the present invention discloses a titanium oxide coating disposed on a porous layer of silica coating. The porous layer of silica coating can be formed using a sol-gel process involving a binder and nanoparticles in a silica sol.

In some embodiments, a sol formulation comprising a binder and nanoparticles can be used. In some embodiments, the binder comprises a silicon-based binder, such as a silane-based binder. The nanoparticles can comprise silicon-based nanoparticles, such as silane-based nanoparticles. A binder can comprise a component used to bind together, e.g., by adhesion and cohesion, one or more types of materials in mixtures. The binder can comprise inorganic and organic components, for example, an alkyltrialkoxysilane-based binder or a tetraethylorthosilicate (TEOS) binder.

In some embodiments, the sol-formulation can be prepared by mixing a silane-based binder, silica based nanoparticles, an acid or base containing catalyst and a solvent system. The sol-formulation can be formed by at least one of a hydrolysis and polycondensation reaction. The sol-formulation can be stirred at room temperature or at an elevated temperature (e.g., 50-60 degrees Celsius) until the sol-formulation is substantially in equilibrium (e.g., for a period of 24 hours). The sol-formulation can then be cooled and additional solvents added to either reduce or increase the ash content if desired. Other details of sol formulations comprising a binder and nanoparticles can be found in co-owned, co-pending applications, application Ser. No. 13/195,119 with filing date of Aug. 1, 2011, entitled "Sol-gel based antireflective coatings using particle-binder approach with high durability, moisture resistance, closed pore structure and controllable pore size"; application Ser. No. 13/195,151 with filing date of Aug. 1, 2011, entitled "Antireflective silica coatings based on sol-gel technique with controllable pore size, density, and distribution by manipulation of inter-particle interactions using pre-functionalized particles and additives", and application Ser. No. 13/273,007 with filing date of Oct. 13, 2011, entitled "Sol-gel based antireflective coatings using alkyltrialkoxysilane binders having low refractive index and high durability", all of which are hereby incorporated by reference.

After drying to form the gel coating, a heat treatment process can be used to burn off the organic components of the binder. Exemplary inorganic materials remaining after combustion of the organic matter for a sol-formulation can include silica from the nanoparticles and silica from the binder. In general, an increase of the binder in a sol formulation would lead to a reduction in pore fraction and a corresponding increase in the refractive index of the resulting anti-reflective coating. The amount of inorganic components remaining after combustion of the organic matter in the sol formulation is called the ash content of the sol formulation.

The silica binder ash content can affect the refractive index of an anti-reflective coating. Thus sol formulations with different binder or nanoparticles characteristics can provide a coated layer with different index of refraction. For example, higher percentage of silica binder ash content can increase the silica contribution from the binders, as compared to the silica contribution from the silica particles, leading to higher index of refraction.

Figure 7:
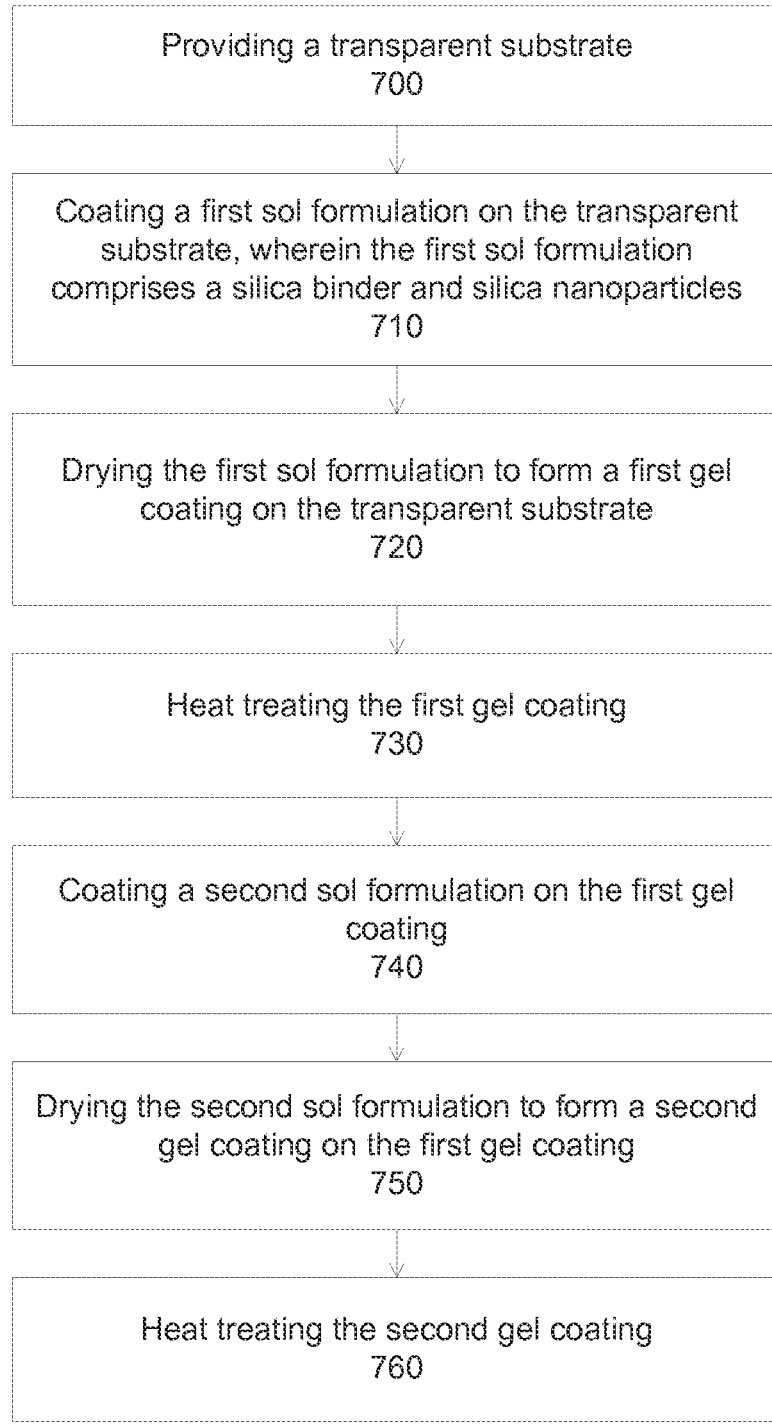
FIG. 7 illustrates an exemplary flowchart to form a coating stack comprising an antireflective layer and a topmost titanium oxide layer according to some embodiments of the present invention.

FIG. 7 illustrates an exemplary flowchart to form a coating stack comprising an antireflective layer and a topmost titanium oxide layer according to some embodiments of the present invention. In operation 700, a transparent substrate is provided. In operation 710, a first sol formulation can be prepared comprising a silica binder and silica nanoparticles. In operation 720, the first sol formulation is dried to form a first gel coating. In operation 730, a second sol formulation can be prepared comprising titanium oxide. In operation 740, the second sol formulation is dried to form a second gel coating. In operation 750, the first and second gel coatings are heat treated to form a multilayer coating.

Figure 8:
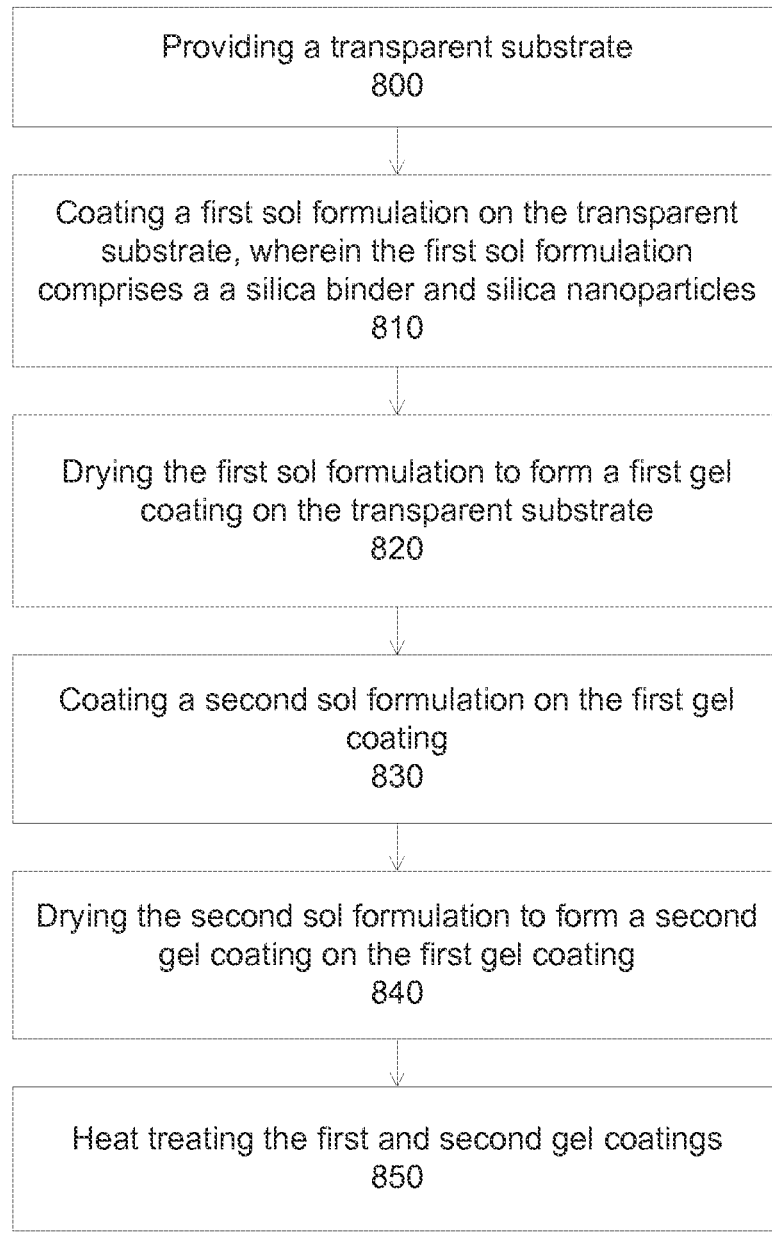
FIG. 8 illustrates another exemplary flowchart to form a coating stack comprising an antireflective layer and a topmost titanium oxide layer according to some embodiments of the present invention.

FIG. 8 illustrates another exemplary flowchart to form a coating stack comprising an antireflective layer and a topmost titanium oxide layer according to some embodiments of the present invention. In operation 800, a transparent substrate is provided. In operation 810, a first sol formulation can be prepared comprising a silica binder and silica nanoparticles. In operation 820, the first sol formulation is dried to form a first gel coating. In operation 830, a second sol formulation can be prepared comprising titanium oxide. In operation 840, the second sol formulation is dried to form a second gel coating. In operation 850, the first and second gel coatings are heat treated to form a multilayer coating.

In some embodiments, multiple sol formulations can be used to form a multilayer coating with different characteristics. For example, the amount of a silane-based binder in the sol-formulations or the total ash content of the sol-formulations can be varied to change the porosity. Further, in addition to the ratio of silane-based binder to silica based nanoparticles, specific combinations of particle size and shape are also believed to contribute to the change in antireflection property.

In some embodiments, a sol formulation can comprise other components, for example, to form a reaction mixture by a hydrolysis or polycondensation reaction. The mixture can be designed to form multilayer coating with different porosity.

In some embodiments, the sol-gel composition can further include an acid or base catalyst for controlling the rates of hydrolysis and condensation. The acid or base catalyst can be an inorganic or organic acid or base catalyst. Exemplary acid catalysts comprise hydrochloric acid (HCl), nitric acid ($HNO_3$), sulfuric acid ($H_2SO_4$), acetic acid ($CH_3COOH$), and combinations thereof. Exemplary base catalysts comprise tetramethylammonium hydroxide (TMAH), sodium hydroxide (NaOH), potassium hydroxide (KOH), and the like.

The sol-gel composition can further include a solvent system. The solvent system can include a non-polar solvent, a polar aprotic solvent, a polar protic solvent, and combinations thereof. Selection of the solvent system and the molecular porogen can be used to influence the formation and size of micelles. Exemplary solvents include alcohols, for example, n-butanol, isopropanol, n-propanol, ethanol, methanol, and other well known alcohols. The solvent system can further include water. The amount of solvent can be from 80 to 95 wt. % of the total weight of the sol-gel composition.

The solvent system can further include water. Water can be present up to 10 times the stoichiometric amount need to hydrolyze the silicon containing precursor molecules. Water can be present from 0.001 to 0.1 wt. % of the total weight of the sol-gel composition. Water can be present up to 10 times the stoichiometric amount need to hydrolyze the silicon containing precursor molecules.

The sol-gel composition can further include a surfactant. In certain embodiments, the surfactant can be used for stabilizing the sol-gel composition. The surfactant can comprise an organic compound that lowers the surface tension of a liquid and contains both hydrophobic groups and hydrophilic groups. Thus the surfactant contains both a water insoluble component and a water soluble component. The surfactant can also be used to stabilize colloidal sols to reduce the precipitation of solids over extended periods of storage.

The sol-formulation can further include a gelling agent or solidifier. The solidifier can be used to expedite the transition of a sol to a gel. It is believed that the solidifier increases the viscosity of the sol to form a gel. The solidifier can be selected from the group comprising: gelatin, polymers, silica gel, emulsifiers, organometallic complexes, charge neutralizers, cellulose derivatives, and combinations thereof.

Although the foregoing examples have been described in some detail for purposes of clarity of understanding, the invention is not limited to the details provided. There are many alternative ways of implementing the invention. The disclosed examples are illustrative and not restrictive.

What is claimed is:

1. A coated article comprising:
   a transparent substrate;
   a plurality of first coatings formed above the transparent substrate, wherein each of the plurality of first coatings comprises at least one silica component and at least one titania component, and wherein at least two of the plurality of first coatings have different formulations of silica and titania components, the formulations differing with respect to a precursor included therein; and
   a second coating formed above the plurality of first coatings, wherein the second coating comprises a titania component.

2. The coated article of claim 1, wherein the different formulations of silica and titania components form first coatings of different porosity.

3. The coated article of claim 1, wherein the different formulations of silica and titania components form first coatings of different index of refraction.

4. The coated article of claim 1, wherein the different formulations of silica and titania components comprise different weight ratios of silica and titania.

5. The coated article of claim 1, wherein the different formulations of silica and titania components comprise silica components of different porosity.

6. The coated article of claim 1, wherein the different formulations of silica and titania components comprise titania components of different porosity.

7. The coated article of claim 1, wherein the second coating comprises crystalline titanium oxide.

8. The coated article of claim 7, wherein the second coating comprises an anatase crystalline phase of titanium oxide.

9. The coated article of claim 1, wherein the second coating comprises porous titanium oxide.

10. The coated article of claim 1, wherein the second coating is non-porous.

11. A coated article comprising:
    a transparent substrate; and
    a plurality of layers formed over the transparent substrate, wherein the plurality of layers are formed using a method comprising the steps of:
       depositing the plurality of first coatings on a transparent substrate, wherein the first coatings are deposited using one or more solution mixtures comprising silica and titania components, wherein at least two of the plurality of first mixtures have different formulations of silica and titania components, the formulations differing with respect to a precursor included therein; and
       depositing a second coating on the plurality of first coatings, wherein the second coating is deposited using a solution comprising titania component.

12. The coated article of claim 11, wherein the second coating comprises an anatase phase of titanium oxide.

13. The coated article of claim 11, wherein the second coating comprises porous titanium oxide.

14. A coated article comprising:
    a transparent substrate;
    a plurality of first coatings on the transparent substrate, wherein the plurality of first coatings comprise silica and titania components, wherein at least two of the plurality of first coatings have different formulations of silica and titania components, the formulations differing with respect to a precursor included therein; and
    a second coating on the plurality of first coatings, wherein the second coating comprises a titanium oxide layer.

15. The coated article of claim 14, wherein the second coating comprises an anatase phase of titanium oxide.

16. The coated article of claim 14, wherein the second coating comprises porous titanium oxide.

17. The coated article of claim 14, wherein the second coating comprises crystalline titanium oxide.

18. The coated article of claim 14, wherein the different formulations of silica and titania components comprise silica components or titania components of different porosity.

* * * * *